Figure 1:
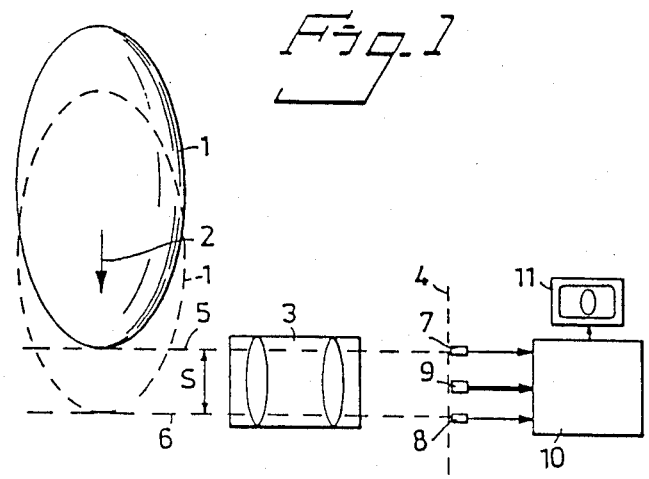

United States Patent [19]

Ransheim

[11] Patent Number: 4,978,859
[45] Date of Patent: Dec. 18, 1990

[54] METHOD AND ARRANGEMENT FOR DETERMINING THE SIZE AND/OR THE SHAPE OF A FREELY FALLING OBJECT

[75] Inventor: Anders Ransheim, Helsingborg, Sweden

[73] Assignee: Gedevelop Electronics AB, Helsingborg, Sweden

[21] Appl. No.: 435,410

[22] PCT Filed: Apr. 22, 1988

[86] PCT No.: PCT/SE88/00204
§ 371 Date: Nov. 1, 1989
§ 102(e) Date: Nov. 1, 1989

[87] PCT Pub. No.: WO88/08958
PCT Pub. Date: Nov. 17, 1988

[30] Foreign Application Priority Data

May 6, 1987 [SE] Sweden .................................. 8701862

[51] Int. Cl.$^5$ .......................................... G01N 21/86
[52] U.S. Cl. .................................. 250/560; 356/386
[58] Field of Search ............ 250/560; 356/379, 385, 356/386

[56] References Cited

U.S. PATENT DOCUMENTS 3,028,501 4/1962 Lamparter .......................... 356/379
3,749,500 7/1973 Carlson .............................. 250/560

Primary Examiner—David C. Nelms
Attorney, Agent, or Firm—Browdy and Neimark

[57] ABSTRACT

Disclosed is a method and an arrangement for determining the shape and/or size of a freely falling drop (1) of molten glass. One end of the drop is detected by means of two photo-diodes (7,8) spaced apart along the fall path for determining the fall speed of the drop. An image of that part of the drop located momentarily between the two photo-diodes (7,8) is projected onto an elongated photo-diode array (9) extending perpendicularly to the fall direction. The photo-diode array (9) is scanned periodically at a given time interval a large number of times during movement of the drop past the array. This provides information relating to the width of the drop at a large number of locations along the length of the drop. The mutual distance between these width determinations are calculated on the basis of the fall speed of the drop and the time interval between the different scans. The shape and size of the drop is calculated from these data.

10 Claims, 1 Drawing Sheet

METHOD AND ARRANGEMENT FOR DETERMINING THE SIZE AND/OR THE SHAPE OF A FREELY FALLING OBJECT

The present invention relates to a method and to a corresponding arrangement for determining size and/or shape of a freely falling object particularly a drop of liquid or semi-liquid material, such as molten glass in particular. The invention has been developed primarily for the purpose of determining the size and shape of freely falling drops of molten glass, but can also be applied for determining the size and shape of other objects.

In the automated manufacture of container glass and like products, the product is formed from a so-called glob which is fed to the mould through a chute. The glass glob has a temperature of 1000°–1100° C. and is ejected through a nozzle in the bottom of a molten-glass feeder channel or tank and is clipped off or sheared in suitable lengths, contingent on the product being produced, e.g. a length of 75–150 mm. One and the same chute may supply several different moulds with glass drops or globs in sequence, so that a glass drop is supplied to an empty mould while earlier filled moulds are being worked. Thus, it is normal for 2–3 glass drops/second to be ejected from the nozzle and clipped-off adjacent thereto. With this type of manufacture of glass products, the shape, volume and temperature of the glass drops have a great significance on the quality of the end product. Although the parameters can be influenced in several ways, there are at present no devices or apparatus by means of which these parameters can be measured, particularly the shape and volume of the glass drops. Consequently, this type of automated manufacture of glass products has been controlled to a large extent by "instinct", which makes it difficult to maintain a uniform quality of the products produced and to reproduce a production approach that has been found to give good results.

The object of the invention is therefore to provide a method and a corresponding arrangement by means of which the shape and/or size of a freely falling object can be determined, and particularly, but not exclusively the volume and shape of a freely falling drop of molten glass.

The characterizing features of the inventive method and arrangement are set forth in the following respective claims.

Figure 2:
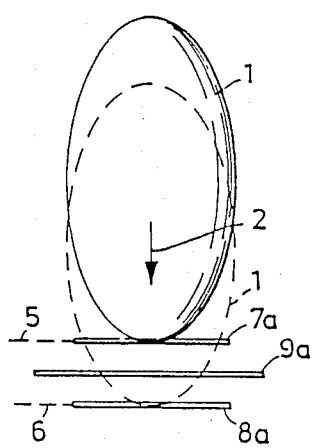
Figure 3:
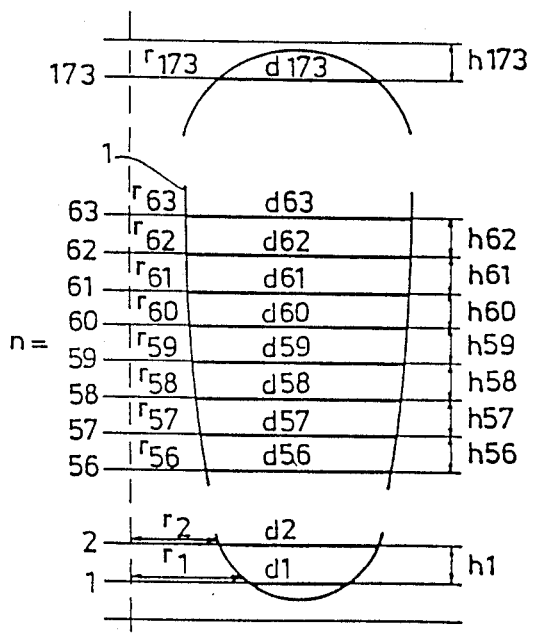

The invention will now be described in more detail with reference to the accompanying drawings, in which FIG. 1 illustrates schematically an arrangement according to the invention;

FIG. 2 is a schematic illustration of the FIG. 1 arrangement seen at right angles to the view in FIG. 1; and FIG. 3 illustrates schematically the inventive method for determining the volume and shape of the falling object.

The drawings illustrate the application of the invention for determining the shape and volume of a freely falling drop of molten glass.

FIG. 1 illustrates schematically a drop of glass 1 which falls in the direction shown by the arrow 2, the glass drop, or corresponding glass mass, being shown in full lines and in broken lines corresponding to two different positions of the drop 1 during its fall. The inventive arrangement comprises a suitable optical device or system 3, which is only illustrated schematically and which images on an imaging plane 4 that part of the glass drop 1 which is located momentarily opposite the optical instrument 3. The optical device, in this regard, is designed to image in the plane 4 slightly more than that part of the glass drop 1 which is located momentarily between two levels 5 and 6 which are spaced apart through a given distance s in the fall direction 2 of the glass drop 1. The illustrated arrangement also includes two photo-diodes 7 and 8 which are positioned behind respective elongated narrow measuring slots 7a and 8a (c.f. FIG. 2) located in the image plane 4 at a mutual spacing corresponding to the distance s between the two levels 5 and 6. Arranged centrally between the two photo-diodes 7 and 8 is an elongated array 9 which includes a large number of mutually adjacent photo-diodes arranged behind an associated, elongated narrow measuring slot 9a located in the image plane 4 (c.f. FIG. 2). Similar to the diode array 9, this measuring slot 9a has a length extension which will ensure positively that the full width of the image of the glass drop 1 projected in the image plane 4 will fall within the measuring slot 9a and the diode array 9. The two photo-diodes 7, 8 and the diode array 9 are connected to a control-and-arithmetical unit 10, the construction and method of operation of which will be described hereinafter.

When the lower end of the falling drop of glass 1 reaches the level 5, the character of the output signal from the photo-diode 7 changes, while in the same way the character of the output signal on the photo-diode 8 changes when the lower end of the glass drop 1 reaches the level 6 a little later on. The output signals from the photo-diodes 7 and 8 are applied to the control-and-arithmetical unit 10, which is constructed to calculate the time difference between the said changes in the output signals from the photo-diodes 7 and 8 and to calculate on the basis of this time difference and the known distance s between the levels 5 and 6, the average speed of the glass drop 1 during the time taken for the lower end of the glass drop 1 to move from the level 5 to the level 6, in accordance with the formula $$V_1 = s/t_1$$

where $t_1$ is the time for the lower end of the glass drop 1 to pass from level 5 to level 6, determined by means of the diodes, and $V_1$ is the aforesaid average speed, hereinafter referred to as the drop entry speed. This speed differs negligibly from the speed of the drop 1 at that moment when the lower end of the drop passes the level between the levels 5 and 6, i.e. the level on which the diode array 9 is located.

The control-and-arithmetical unit 10 is constructed to scan the diode array 9 periodically, at a given time interval, during the whole of the time taken for the falling glass drop 1 to pass the level of the diode array 9. This scanning process can be initiated automatically, e.g. when the lower end of the glass drop 1 reaches the level 5 and the character of the output signal of the photodiode 7 changes therewith, and can be interrupted automatically when the upper end of the glass drop 1 reaches the level 6 and the character of the output signal from the photo-diode 8 is again changed. Each scanning of the diode array 9 should take place so rapidly that the fall distance of the drop 1 is no greater than 0.3 mm during the scanning process. Scanning of the diode array 9 can be effected rapidly even when the array contains a large number of diodes, e.g. by dividing the array into a multiple of sections which are scanned in parallel. The time interval between mutually sequential scans should be so short that the distance through which the glass drop falls between two mutually sequential scans of the array 9 will not exceed ca 1-2 mm. The resolution and measuring accuracy of the system become greater with greater numbers of diodes in the array, with faster scanning of the diode array, and with shorter time intervals between mutually adjacent scans.

During a scanning of the diode array 9, the character, i.e. the signal level, of the output signals from the diodes located within the image of the glass drop 1 projected in the image plane 4 is different to the character of the output signals emanating from those diodes which lie outside the image.

The control-and-arithmetical unit 10 may, advantageously, be constructed to accept solely output signals from those diodes in the array 9 which lie within the image of the drop 1. It will be perceived that the number of such diodes will constitute a direct measurement of the width of the drop 1 in the projection of the image plane 4. If it is assumed that the drop has a circular cross-section, this width measurement will also be the diameter of the drop. The output signals received from the photo-diodes of the array 9, and therewith information relating to the width or diameter of the drop at the scanning location, are advantageously stored in a memory, suitably a RAM-memory, in the control-and-arithmetical unit 10.

Thus, during periodic scanning of the diode array 9, as the glass drop 1 moves past the array, there is obtained a series of width or diameter values for mutually different locations along the extent of the glass drop, as illustrated schematically in FIG. 3, where the numbered order of sequence is designated n=1, 2, 3, etc. and the corresponding width or diameter values are designated $d_1$, $d_2$, $d_3$, etc.

An advantage is also afforded when, with each scanning of the diode array 9, it is established which diode in the array is the first diode, seen from one end of the array, which lies within the projected image of the glass drop 1. This provides information relating to the position of the image, and therewith the drop 1, in the lateral direction, this information being designated $r_1$, $r_2$, $r_3$, etc. in FIG. 3 and also being stored in the RAM-memory in the control-and-arithmetical unit 10.

Since all of the aforesaid measurement values obtained from a glass drop 1 are stored intermediately direct into a RAM-memory in the control-and-arithmetical unit 10, a very high scanning speed and data transfer speed to the RAM-memory in the unit 10 can be achieved without limitations caused by the hardware and/or software in the unit 10. When all the measurements of a glass drop 1 have been taken, the information stored in the RAM-memory can be processed by the unit 10.

As beforementioned, this information consists of:

the time $t_1$ taken for the lower end of the glass drop 1 to pass between the levels 5 and 6, i.e. through the distance s;

the number n of scans of the diode array which have provided any information;

the width or diameter $d_n$ of the drop at each scan made by the array 9;

the lateral position $r_n$ of the drop 1 at each scan of the array 9.

The unit 10 is constructed to calculate the distance, seen in the fall direction or length direction of the drop 1, between the different width or diameter measurements, on the basis of the aforesaid information. This distance is referenced $h_1$, $h_2$, $h_3$, etc in FIG. 3. It will be understood that these distances correspond to the distance through which the glass drop 1 falls between the different scans of the diode array. The unit 10 calculates these fall distances with the aid of the formula $$h_n = v_1 t + (n-1)at^2 + at^2/2$$

where n is the numerical order of the actual array scan concerned, t is the time interval between mutually sequential scans, a is the gravitational acceleration 9.81 m/s$^2$, and $v_1$ is the entrance speed of the glass drop 1 calculated in the aforedescribed manner by means of the formula $$v_1 = s/t_1$$

The arithmetical unit 10 is able to calculate the total volume of the glass drop 1 with the aid of this data, by calculating for each diameter value the volume of a cylinder which has the particular diameter $d_n$ and the height $h_n$ to the next diameter value, i.e.

$$vol_n = \pi d_n^2 h_n / 4$$

whereafter the total volume of the glass drop 1 can be obtained by adding up all part volumes $vol_n$, i.e.

$$vol_{tot} = \sum_1^n vol_n$$

Furthermore, the total length or height $h_{tot}$ can be obtained by adding up all part heights $h_n$, i.e.

$$h_{tot} = \sum_1^n h_n$$

Connected to the control-and-arithmetical unit 10 is a display unit 11 which has the form of a display screen and/or a printer by means of which desired information relating to the glass drop can be presented visually and/or printed out. In this regard, it is also possible to show or to draw the shape of the glass drop, i.e. in the form illustrated in FIG. 3.

It has been assumed in the aforegoing that the glass drop has an essentially circular cross-sectional shape. If this assumption does not apply with any degree of certainty, a further diode array with an associated optical device can be arranged for scanning the glass drop or glob in a direction perpendicular to the scanning direction of the first diode array. In this case there are obtained two mutually perpendicular width values of the glass drop with each scan effected simultaneously by the diode arrays, thereby enabling the volume of the drop to be calculated to an acceptable degree of accuracy despite the fact that the drop does not have a completely circular cross-sectional shape.

When measuring a falling drop or glob of the molten glass which has a temperature of ca 1000°-1100° C., both the photodiodes 7, 8 and the photo-diodes array 9 can work with the radiation emitted by the actual glass drop itself and hence no additional illumination need be used.

Although the invention has been developed primarily for determining the size and shape of the falling drop of molten glass, as before described, it will be understood that the invention can be used generally for determining the size, shape or position of any freely falling body whatsoever. In these latter applications it may be necessary to illuminate the object. This can be achieved by either illuminating the front side or the rear side of the object, as seen in relation to the location of the optical system.

I claim:

1. A method of determining the shape and/or the size of a freely, falling object, particularly of a drop of liquid or semi-liquid material, such as molten glass in particular, characterized by optically detecting one end of the object (1) at two positions (5, 6) located at a given distance apart in the fall path (2) of the object, and determining the time difference between said two detections;

calculating the speed at which the object falls during movement of said detected end between the two detection locations from said time difference and the distance (s) between the detection locations;

projecting, during the fall of the object past the detection locations, that part of the object which is located between the detection locations at each moment in time onto an elongated array (9) of a large number of mutually adjacent radiation detectors extending transversely to the fall direction of the object;

scanning said array (9) periodically at a given time interval a large number of times during the fall of the object past the array;

preserving information obtained from each scanning of the array relating to the number of detectors in the array which during the scan were covered by the image of the object projected onto the array, and therewith information concerning the width of the object;

calculating from said calculated speed and said given time interval the values of the distance through which the object falls between the different scans of the array (9); and using the said width values and said fall distances for determining the size of the object.

2. A method according to claim 1, characterized by preserving from each scan of the array (9) information indicative of which radiation detector in the array is located at one edge of the object image projected on the array and therewith information indicative of the position of the object in a lateral direction at the moment of the scan in question, and constructing the contours of the object in the projection plane with the aid of said information relating to the width of the object and the lateral position thereof at the moment of each scan, together with said calculated fall distance of the object between the different scans.

3. A method according to claim 1, in which the object consists of a drop of liquid or semi-liquid material, particularly molten glass, characterized in that the volume of the drop (1) is determined by calculating for each of said width values the volume of a cylinder whose diameter is said width value and whose height is the calculated fall distance between the array scan corresponding to the width value concerned and the nearest scan in time, and by adding together the thus calculated volumes for all width values.

4. A method according to claim 1, characterized by projecting a further image of the object, at right angles to the projection direction of the first mentioned image, onto a further elongated array of mutually adjacent radiation detectors, said further array being arranged on the same level as the first mentioned array but at right angles thereto, and by scanning said further array in the same manner as the first mentioned array and processing the thus obtained information in a corresponding manner to the information obtained when scanning the first mentioned array.

5. An arrangement for determining the shape and/or size of a freely falling object (1), particularly a drop of liquid or semi-liquid material, such as molten glass in particular, characterized in that it includes two radiation detectors (7, 8) which are located at a mutual distance (s) apart along the path through which the object falls and which are operative in detecting the falling object and to produce a characteristic output signal when one end of the object passes the detector in question;

an elongated array (9) of a large number of mutually adjacent radiation detectors which is arranged between the two first mentioned radiation detectors (7, 8) perpendicularly to the fall direction (2) of the $bject (1);

an optical device (3) for projecting onto the array (9) an image of that part of the object which is located opposite the array (9) at any moment in time; and a control-and-arithmetical unit (10) which is arranged:

to receive said output signals from the two first mentioned radiation detectors (7, 8) and, on the basis of the time difference between the signals and the given distance (s) between the two first mentioned radiation detectors (7, 8), to calculate the fall speed of the object (1) when the detector end of the object passes said detectors;

to scan said array (9) periodically at a given time interval, and to receive from the array (9) output signals indicative of which of the radiation detectors in said array (9) were located within the object image projected on the array during a scan;

to establish with each scan of the array (9) the number of radiation detectors which lay within the projected object image, and therewith establish the width of the image and the object;

to calculate the distances through which the object falls between the various scans on the basis of the established fall speed and said given time interval between the scans of the array (9); and to determine the size and/or the shape of drop on the basis of the width values of the object at the different scans and said values of the distance through which the object falls between the different scans.

6. An arrangement according to claim 5, characterized in that the control-and-arithmetical unit (10) is also constructed to establish with each scan of the array (9) which of the detectors in said array is the first detector, seen from one end of the array, which lies within the projected image of the object (1) and therewith establish the lateral position of the image and the object during the scan in question.

7. An arrangement according to claim 5 characterized in that the control-and-arithmetical unit (10) includes a RAM-memory which is constructed to receive and to store intermediately the output signals from the two first mentioned detectors (7 and 8) and the array (9) for subsequent processing of the signals.

8. An arrangement according to claim 5, characterized in that it further includes a display unit (11) which is connected to the control-and-arithmetical unit (10) and which has the form of a display screen and/or a printer for presenting and/or printing measured and calculated data relating to the size and/or the shape of the object.

9. An arrangement according to claim 8, characterized in that the display unit (11) is constructed to illustrate graphically the contours of the object in the projection plane of the optical device (3) in response to control instructions from the control and arithmetical unit (10).

10. An arrangement according to claim 5, characterized in that it further includes a second elongated array of mutually adjacent radiation detectors which is arranged on the level of the first mentioned array (9) and at right angles thereto and which is provided with an associated optical device for projecting an image of the object (1) on said second array in a direction perpendicular to the projection direction of the first mentioned optical device (3), and in that the control-and-arithmetical unit (10) is also constructed to scan said second array in the same manner as the first array (9).

* * * * *